United States Patent
Plisch et al.

(10) Patent No.: US 10,619,628 B2
(45) Date of Patent: Apr. 14, 2020

(54) FUEL PUMP WITH IMPROVED DELIVERY PROPERTIES

(71) Applicant: Robert Bosch GmbH, Stuttgart (DE)

(72) Inventors: Andreas Plisch, Marbach (DE); Frank Nitsche, Remseck am Neckar (DE); Joerg Heyse, Besigheim (DE); Siamend Flo, Schwieberdingen (DE); Thorsten Allgeier, Untergruppenbach (DE); Walter Maeurer, Korntal-Muenchingen (DE); Tim Reule, Muehlacker-Enzberg (DE)

(73) Assignee: Robert Bosch Gmbh, Stuttgart (DE)

( * ) Notice: Subject to any disclaimer, the term of this patent is extended or adjusted under 35 U.S.C. 154(b) by 316 days.

(21) Appl. No.: 15/532,165

(22) PCT Filed: Sep. 2, 2015

(86) PCT No.: PCT/EP2015/070050
§ 371 (c)(1),
(2) Date: Jun. 1, 2017

(87) PCT Pub. No.: WO2016/087064
PCT Pub. Date: Jun. 9, 2016

(65) Prior Publication Data
US 2017/0268469 A1    Sep. 21, 2017

(30) Foreign Application Priority Data
Dec. 4, 2014   (DE) .................. 10 2014 224 938

(51) Int. Cl.
*F04B 17/04*     (2006.01)
*F02M 37/10*     (2006.01)
(Continued)

(52) U.S. Cl.
CPC .......... *F04B 17/046* (2013.01); *F02M 37/08* (2013.01); *F02M 37/10* (2013.01);
(Continued)

(58) Field of Classification Search
CPC ...... F04B 17/04; F04B 17/044; F04B 17/046; F04B 17/048; F04B 35/048; F04B 35/045;
(Continued)

(56) References Cited

U.S. PATENT DOCUMENTS 5,015,156 A * 5/1991 Scholz ............... F02M 37/08
                                             417/370
9,500,170 B2 * 11/2016 Nong ................. F02M 51/061

FOREIGN PATENT DOCUMENTS

EP     1336751 A1    8/2003
EP     1340906       9/2003
(Continued)

OTHER PUBLICATIONS

International Search Report for Application No. PCT/EP2015/070050 dated Dec. 4, 2015 (English Translation, 2 pages).

*Primary Examiner* — Peter J Bertheaud
(74) *Attorney, Agent, or Firm* — Michael Best & Friedrich LLP

(57) ABSTRACT

The present invention relates to a fuel pump (1) which comprises a pump housing (2), a delivery element (3) for delivering fuel, a heat-generating actuator (4) for actuating the delivery element (3), a first fuel path (5) which leads from an inlet (20) to a delivery space (7), and a second fuel path (6) which leads from the inlet (20) past the heat-generating actuator (4) to a first housing opening (21), wherein the first housing opening (21) is arranged above the inlet (20) in the vertical direction (V). The present invention also relates to a fuel pump arrangement which comprises a
(Continued)

fuel pump (1) according to the invention and a fuel tank (10) in which the fuel pump (1) is at least partially and preferably entirely arranged. The present invention also relates to a method for operating a fuel pump (1).

21 Claims, 3 Drawing Sheets

(51) Int. Cl.
*F02M 51/04* (2006.01)
*F02M 37/08* (2006.01)
*F02M 57/02* (2006.01)
*F04B 35/04* (2006.01)
*F02M 37/04* (2006.01)

(52) U.S. Cl.
CPC ........ *F02M 37/103* (2013.01); *F02M 37/106* (2013.01); *F02M 51/04* (2013.01); *F02M 57/027* (2013.01); *F04B 17/04* (2013.01); *F04B 17/044* (2013.01); *F04B 17/048* (2013.01); *F04B 35/045* (2013.01); *F02M 37/043* (2013.01)

(58) Field of Classification Search
CPC ...... F02M 51/04; F02M 57/027; F02M 37/08; F02M 37/10; F02M 37/103; F02M 37/106
USPC .................................................. 417/366, 370
See application file for complete search history.

(56) References Cited

FOREIGN PATENT DOCUMENTS

| | | |
|---|---|---|
| EP | 1614890 | 1/2006 |
| GB | 2478876 | 9/2011 |
| JP | S5625082 U | 3/1981 |
| JP | H048777 U | 1/1992 |
| JP | 2003172225 A | 6/2003 |
| JP | 2007056802 A | 3/2007 |
| JP | 2010190069 A | 9/2010 |
| WO | 2015169476 | 11/2015 |
| WO | 2015169480 | 11/2015 |

* cited by examiner

FUEL PUMP WITH IMPROVED DELIVERY PROPERTIES

BACKGROUND OF THE INVENTION

The present invention concerns a fuel pump for supplying fuel in a motor vehicle, such as e.g. a motorcycle. A further aspect of the present invention concerns a fuel pump arrangement which comprises such a fuel pump and a fuel tank in which the fuel pump is arranged. Furthermore, the present invention concerns a method for operating such a fuel pump.

Such a fuel pump is known for example from GB 2478876 B. This is a fuel pump, in particular a magnetic piston pump, which has a piston, an actuator for operating the piston, a return element for returning the piston to a starting position, an inlet valve, a delivery space and an outlet valve. By actuation of the piston, in the intake phase fuel is drawn into the delivery space via the inlet valve. In the delivery phase, the fuel is conveyed from the delivery space via the outlet valve. Under temperature loading and at low suction pressure, the fuel can gasify at the inlet valve, whereby the delivery space is largely filled with fuel vapor. This can substantially reduce the delivery level and function of the pump, to the extent of total failure.

SUMMARY OF THE INVENTION

In contrast, the fuel pump according to the invention has the advantage that the fuel pump has an improved delivery behavior, in particular on delivery of hot fuel close to its boiling point. This is achieved according to the invention by structural measures so that waste heat from the heat-generating actuator is used to create a stack effect. This creates an improved flow conduction in the fuel pump and allows subsequent cooling of the fuel in a suction region of the fuel pump. Furthermore, aspiration of fuel vapors into a delivery space of the fuel pump is prevented. Here, the fuel pump according to the invention comprises a pump housing, a delivery element for delivering fuel, a heat-generating actuator for actuating the delivery element, a first fuel path which leads from an inlet to a first delivery space, and a second fuel path which leads from the inlet past the heat-generating actuator to a first housing opening, wherein the first housing opening is arranged above the inlet in the vertical direction. Furthermore, the heat-generating actuator is cooled, which secures the function of the fuel pump against failure. The pump housing preferably has a base body and a holder which in particular is formed as a platform.

Preferably, a flow direction in the second fuel path substantially corresponds to a longitudinal axis of the fuel pump. This facilitates the initiation and propagation of the stack effect.

Furthermore, preferably, a deflector element is arranged on the pump housing which deflects fuel after the inlet in the direction of the second fuel path. This supports the stack effect. Furthermore, the pressure losses in the second fuel path may be reduced.

Furthermore, preferably, the fuel pump has a pre-chamber which is arranged after the inlet. The pre-chamber is preferably formed as a recess by removal of material from the pump housing of the fuel pump. Advantageously, in the pre-chamber the fuel is divided into a first flow via the first fuel path and a second flow via the second fuel path. The first flow corresponds to a delivery volume which is created by movement of the delivery element, wherein the second flow corresponds to a convection flow created by the stack effect.

Furthermore, the pump housing has at least one first fuel path opening and at least one second fuel path opening which are arranged downstream of the inlet or pre-chamber in the flow direction. The first fuel path runs through the first fuel path opening and the second fuel path runs through the second fuel path opening.

Particularly preferably, the deflector element has a tilt angle from 0 to 90 degrees, preferably 30 degrees to 60 degrees, in particular 45 degrees, relative to the longitudinal axis of the fuel pump.

Furthermore, preferably, the deflector element is formed as a cone filter, wherein the first fuel path runs through the cone filter. As well as deflecting the fuel, the cone filter ensures that any vapor bubbles occurring are kept away from the first fuel path. This prevents the vapor bubbles from entering the delivery space, which could greatly restrict the function of the fuel pump. The shape of the cone filter allows the vapor bubbles to be moved in the direction of the second fuel path and be carried by the second flow in the second fuel path. Particularly preferably, the vapor bubbles occurring may be removed from the fuel pump, in particular through the first housing opening. The use of a cone filter is furthermore advantageous since reductions in pressure and volume flow are eliminated, in comparison with the use of no filter or a cylindrical filter. If no filter is provided, the vapor bubbles can enter the delivery space, whereby the fuel delivery quantity and hence also the pressure are influenced.

Furthermore, preferably, the pump housing may have a second fuel path opening through which the second fuel path runs, and wherein the cone filter terminates directly at the second fuel path opening. This creates a flow-favorable design of the second fuel path. In particular, the cone filter is tilted such that a tilted part of the cone filter terminates directly at the second fuel path opening.

According to a preferred embodiment of the present invention, the second fuel path leads past an inside and an outside of the heat-generating actuator. The circulation of fuel around the heat-generating actuator allows a large part of the resulting heat to be transmitted to the fuel. This has the result that the circulating fuel is heated more, whereby the stack effect is maintained and reinforced.

Furthermore, preferably, the heat-generating actuator is a magnetic coil. Firstly, the use of a magnetic coil allows actuation of the delivery element in a simple and reliable fashion. Secondly, a magnetic coil has a rapid and large heat output, whereby in the fuel pump a stack effect can be established rapidly and hence a convection flow created.

Furthermore, preferably, the fuel pump has a housing component which is configured to close an opening of a fuel tank in which the fuel pump may be arranged. The pump housing and the housing component together form a complete housing. Furthermore, the housing component at least partially surrounds the pump housing. In this way, the fuel pump may be configured in standardized fashion, wherein the housing component may be produced customer-specifically. Alternatively, the pump housing and the housing component may be configured integrally. Furthermore, preferably, the housing component has a second housing opening and a third housing opening. Through the second housing opening, fuel can be delivered from the fuel tank through the housing component to the fuel pump inlet, wherein the fuel delivered by the fuel pump can be conveyed further via the third housing opening.

Furthermore, preferably, the housing component has a return channel which at a first end of the return channel stands in flow connection with the first housing opening via the second housing opening, and at a second end of the return channel stands in flow connection with the inlet of the fuel pump. In this way, the fuel heated by the waste heat from the heat-generating actuator may be cooled by the fuel in the fuel tank and supplied to the fuel pump inlet. Thus a suction region of the fuel pump is cooled, which leads to an improved delivery behavior. Also, by returning cooled fuel to the fuel pump inlet, a circuit is created which pre-accelerates the fuel in the suction region of the fuel pump. This leads to a reduction in suction losses.

Preferably, the fuel pump may also comprise a recirculation line which connects the first housing opening of the pump housing to the second housing opening of the housing component, wherein the second housing opening stands in flow connection with the fuel pump inlet. In this way, the fuel heated by the waste heat from the heat-generating actuator is supplied in targeted fashion to the fuel pump inlet. Thus the return of fuel to the fuel pump inlet creates a circuit which pre-accelerates the fuel in the suction region of the fuel pump. This leads to a reduction in suction losses. As well as a production of a new fuel pump with the recirculation line according to the invention, it is possible to equip an existing fuel pump with the recirculation line according to the invention.

Advantageously, the recirculation line may have a branch line downstream of the first housing opening. The branch line allows the removal of any vapor bubbles from the fuel pump. This reduces the risk of a fall in delivery quantity due to gas formation in the delivery space of the fuel pump. Therefore the delivery space or fuel pump may have smaller dimensions. In particular, a delivery space volume may be reduced by a factor of four. This achieves a faster dynamic and lower energy consumption for the delivery of fuel. Alternatively or additionally, a structural complexity of the actuator or magnetic circuit may be reduced.

Particularly preferably, the branch line may be formed rectilinear in the vertical direction. It may furthermore be advantageous if the branch line is arranged centrally relative to the longitudinal axis of the fuel pump. Thus the vapor bubbles occurring can be removed quickly and reliably from the fuel pump, and hence an improved delivery behavior of the fuel pump guaranteed.

Advantageously, the recirculation line may contain a bell-shaped region which is arranged at a first housing opening, in particular centrally relative to the longitudinal axis of the fuel pump, and has a lower region of wider cross-section and a pin-shaped protruding lower region. The pin-shaped protruding lower region may serve as the branch line. Alternatively, the branch line may be attached to the pin-shaped protruding lower region. Thus sufficient free cross-section is available for gas dissipation.

According to a further alternative embodiment, vapor bubbles occurring may be removed from the fuel pump through a bore in the bell-shaped region.

Further preferably, a filter element, which is arranged on the housing component, may be provided between the recirculation line and the second housing opening. Thus the recirculated fuel may be filtered before the fuel is supplied to the delivery space of the fuel pump. This secures the function of the fuel pump against failure.

It is also advantageous if the recirculation line has a cover region via which the recirculation line is arranged on the second housing opening of the housing component, and which has at least one first cover opening and at least one second cover opening, wherein the at least one second cover opening is arranged above the at least one first cover opening in the vertical direction. Preferably, the cover region defines a mixing zone. Through the first cover opening, cool fuel from a fuel tank may enter the mixing zone in which the cool fuel is mixed with the fuel heated by the waste heat from the actuator. If the fuel drawn in from the fuel tank is already close to its boiling state because of high ambient temperature or direct sunlight, the mixing with the recirculating warmer fuel ensures that the fuel drawn in from the fuel tank boils in the mixing zone and becomes less volatile. The resulting gas is returned to the fuel tank through the second cover opening. Because the recirculating fuel emits part of its heat to the fuel from the fuel tank with which it is mixed, the recirculating fuel becomes cooler. The temperature of the mixture of the two fuel portions lies below its boiling point. A reduced pressure in the delivery space of the fuel pump due to the suction, consequently does not lead to the formation of gas in the delivery space, so the delivery quantity cannot fall.

According to a preferred embodiment of the present invention, a plurality of first cover openings and a plurality of second cover openings are provided, wherein the first cover openings and/or the second cover openings are formed as perforations and arranged on an outer periphery of the cover region of the recirculation line.

Further preferably, the recirculation line may be attached to the pump housing and/or the filter element and/or the housing component by means of at least one clip connection. Thus a releasable fixing of the recirculation line is achieved in a simple and economic fashion.

A further aspect of the present invention concerns a fuel pump arrangement comprising a fuel pump according to the invention and a fuel tank in which the fuel pump is at least partially, preferably completely, arranged. Thus a compact construction of the fuel pump arrangement is possible, which is particularly important in motorcycles.

Preferably, the second fuel path opens into the fuel tank. Thus the fuel from the second fuel path is returned. Furthermore, preferably vapor bubbles occurring can enter the fuel tank via the first housing opening, wherein the vapor bubbles are either condensed by the fuel present in the fuel tank in order not to lose any fuel, or in some cases removed from the fuel tank.

The present invention furthermore concerns a method for operating a fuel pump, comprising the steps of supplying fuel from a fuel tank via a first fuel path into a delivery space, wherein the first fuel path leads from an inlet of the fuel pump to the delivery space, and conducting fuel from the fuel tank via a second fuel path past a heat-generating actuator, wherein the second fuel path leads from the inlet to a first housing opening, and wherein the fuel is heated by the heat-generating actuator for gasification of highly volatile parts of the fuel, wherein the first housing opening is arranged above the inlet in the vertical direction. This is associated with the advantages described above in relation to the fuel pump and the fuel pump arrangement.

Advantageously, after the second inlet, fuel is deflected in the direction of the second fuel path.

It is furthermore advantageous if the heated fuel enters the fuel tank via the first housing opening and is cooled in the fuel tank, and the cooled fuel is returned to the inlet of the fuel pump. In this way cooling takes place in a suction region of the fuel pump. Thus gasification of the fuel in the suction region of the fuel pump may be reduced and its function secured against failure.

BRIEF DESCRIPTION OF THE DRAWINGS

Exemplary embodiments of the invention are described in detail below with reference to the accompanying drawing, wherein the same parts or those of equivalent function carry the same reference numerals. The drawings show.

DETAILED DESCRIPTION

Figure 1:
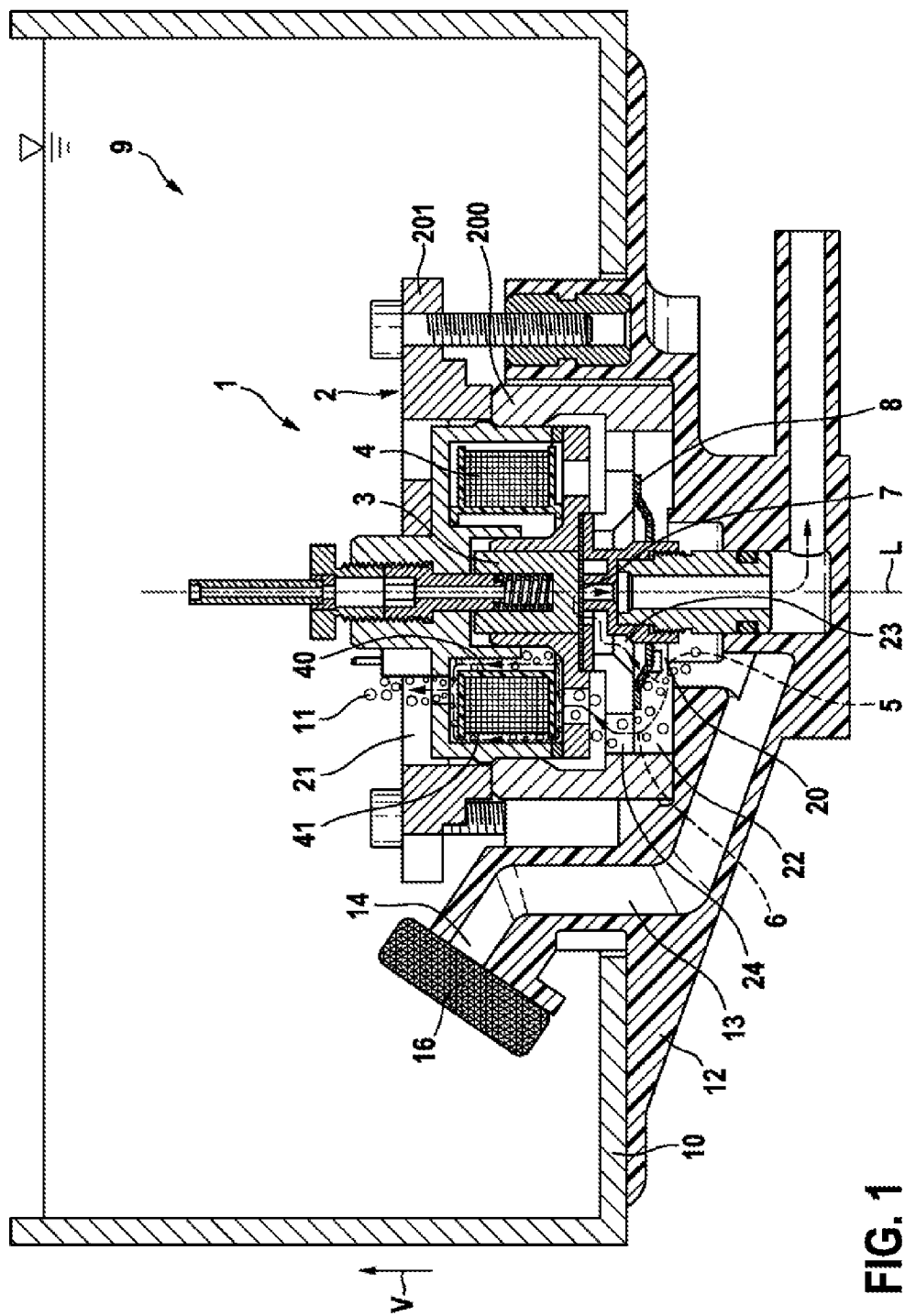
FIG. 1 a simplified, diagrammatic cross-section view of a fuel pump arrangement with a fuel pump according to a first exemplary embodiment of the present invention, FIG. 2 an enlarged region of the fuel pump arrangement shown in FIG. 1, and FIG. 3 a simplified, diagrammatic cross-section view of a fuel pump arrangement with a fuel pump according to a second exemplary embodiment of the present invention.
Figure 2:
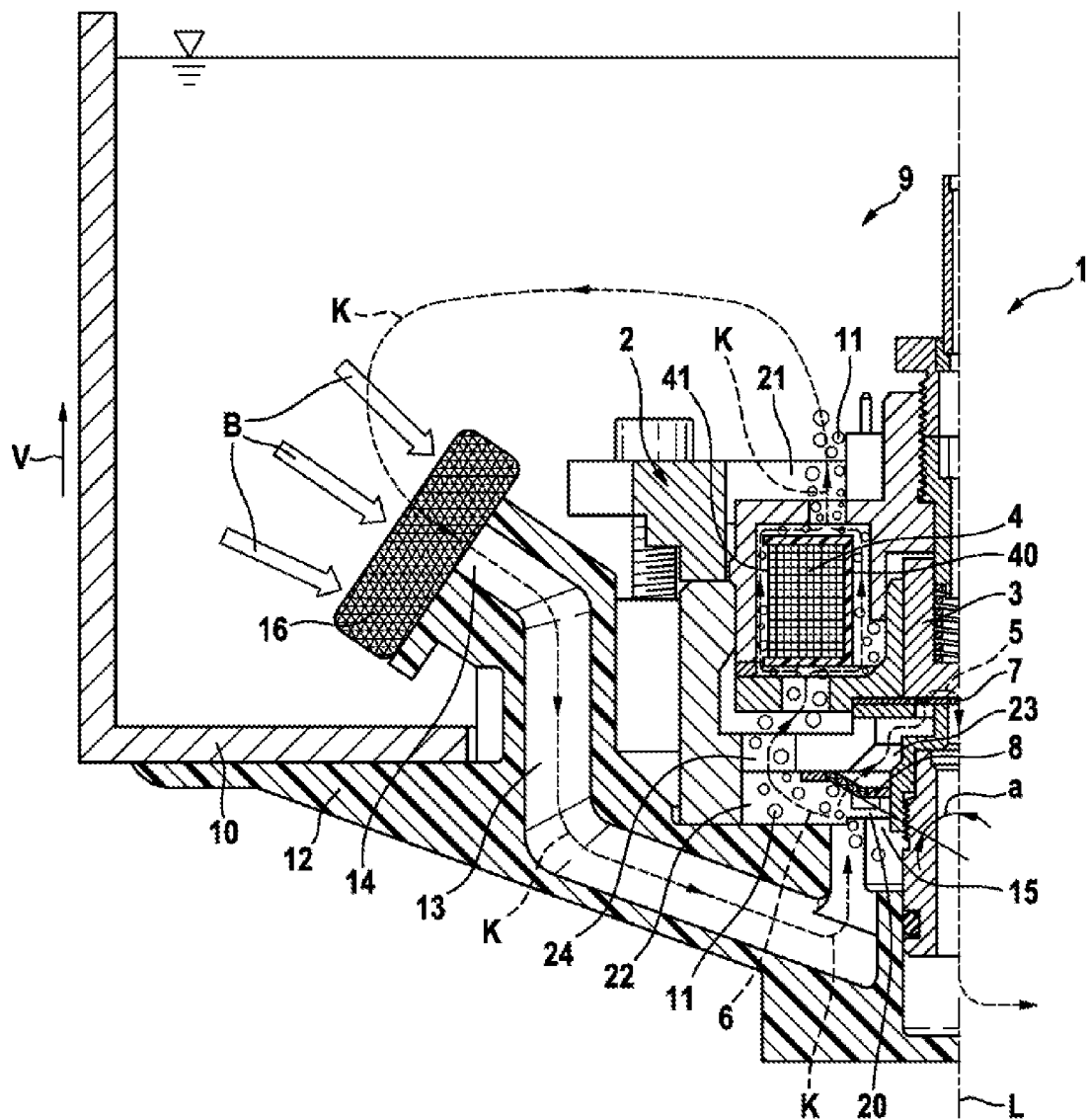

With reference to FIGS. 1 and 2, a fuel pump 1 and fuel pump arrangement 9 according to a first exemplary embodiment of the present invention are described in detail below.

As evident from FIGS. 1 and 2, the fuel pump 1 according to the invention is partially arranged in a fuel tank 10 of the fuel pump arrangement 9.

Furthermore, the fuel pump 1 comprises a pump housing 2, a delivery element 3 for delivering fuel, and a heat-generating actuator 4 formed as a magnetic coil for actuating the delivery element 3. The delivery element 3 is formed as a piston. Furthermore, the fuel pump 1 has a first fuel path 5 which leads from an inlet 20 to a delivery space 7, and a second fuel path 6 which leads from the inlet 20 past the heat-generating actuator 4 to a first housing opening 21.

According to the invention, the first housing opening 21 is arranged above the inlet 20 in a vertical direction V. In operation of the fuel pump 1, this arrangement causes a stack effect which will be explained in more detail in the description of the function of the fuel pump 1. A flow direction of the fuel in the second fuel path 6 substantially corresponds to a longitudinal axis L of the fuel pump 1.

Furthermore, the fuel pump has a pre-chamber 22 which is arranged downstream of the inlet 20. The pre-chamber is formed as a recess by removal of material from the pump housing 2 of the fuel pump 1. Furthermore, a first fuel path opening 23 and a second fuel path opening 24 are provided in the pump housing 2. The first fuel path 5 runs through the first fuel path opening 23, and the second fuel path 6 runs through the second fuel path opening 24. The second fuel path 6 leads past an inside 40 and an outside 41 of the heat-generating actuator 4, and then opens into the fuel tank 10.

To improve the delivery behavior of the fuel pump 1, a deflector element 8 is arranged on the pump housing 2 and deflects fuel after the inlet 20 in the direction of the second fuel path 6 or the second fuel path opening 24. For this, the deflector element 8 has a tilt angle a of 60 degrees relative to the longitudinal axis L of the fuel pump 1. This ensures a low-loss transition between the inlet 20 and the second fuel path opening 24.

In particular, the deflector element 8 comprises a cone filter, wherein the first fuel path 5 runs through the cone filter via a first fuel path opening 23. The cone filter terminates directly at the second fuel path opening 24. This allows a flow-favorable design of the second fuel path.

As well as deflecting fuel after the inlet 20 in the direction of the second fuel path 6, the cone filter ensures that any vapor bubbles 11 occurring are kept away from the first fuel path 5. The cone filter serves to guide the vapor bubbles 11 in the direction of the second fuel path 6 to the second fuel path opening 24.

The pump housing 2 has a base body 200 and a platform-like holder 201. Furthermore, the fuel pump 1 preferably has a housing component 12 which, in this exemplary embodiment, is configured as separate component. Alternatively, the housing component 12 may be configured integrally with the pump housing 2 of the fuel pump 1. The housing component 12 comprises a return channel 13 which at a first end 14 stands in flow connection with the first housing opening 21 via a second housing opening 18, and at a second end 15 stands in flow connection with the inlet 20 of the fuel pump 1. Fuel may be returned to the inlet 20 through the return channel 13.

A method for operating the fuel pump 1 according to the present invention is described below in detail with reference to FIG. 2.

In operation of the fuel pump 1, fuel is supplied from the fuel tank 10 to the inlet 20 of the fuel pump 1. In the pre-chamber 22, the fuel flow divides into a first flow via the first fuel path 5 and a second flow via the second fuel path 6. The first flow corresponds to the actual delivery volume of the fuel pump 1 which is generated by actuation of the delivery element 3 by the heat-generating actuator 4, and enters the delivery space 7. The heat-generating actuator 4 thus generates waste heat, whereby the second flow via the second fuel path 6 is created by convection. The waste heat of the actuator 4 also causes gasification of highly volatile parts of the fuel.

The heated fuel in the second fuel path 6 rises in the vertical direction V and enters the fuel tank 10. As well as the heated fuel, the resulting vapor bubbles 11 enter the fuel tank 10, from where they are finally removed in a manner not shown, or are condensed.

In the fuel tank 10, the heated fuel is cooled by the fuel present in the fuel tank 10 which usually has a lower temperature. Since the heated fuel of the second fuel path 6 rises upward in the vertical direction V, a reduced pressure occurs in the pre-chamber 22, whereby fuel is drawn out of the fuel tank 10 (arrow B). This phenomenon, known as a stack effect, also causes the cooled fuel to be returned to the inlet 20 of the fuel pump 1 via the return channel 13, at the first end 14 of which a filter element 16 is arranged. Thus a circuit is created (arrow K in FIG. 2) which is self-supporting and also self-amplifying.

The fuel pump 1 according to the invention has an improved delivery behavior, in particular on delivery of hot fuel, wherein better cooling and a reduction in suction losses are also achieved. Also, the present invention allows use of the piston pump principle for hot fuel operation.

Figure 3:
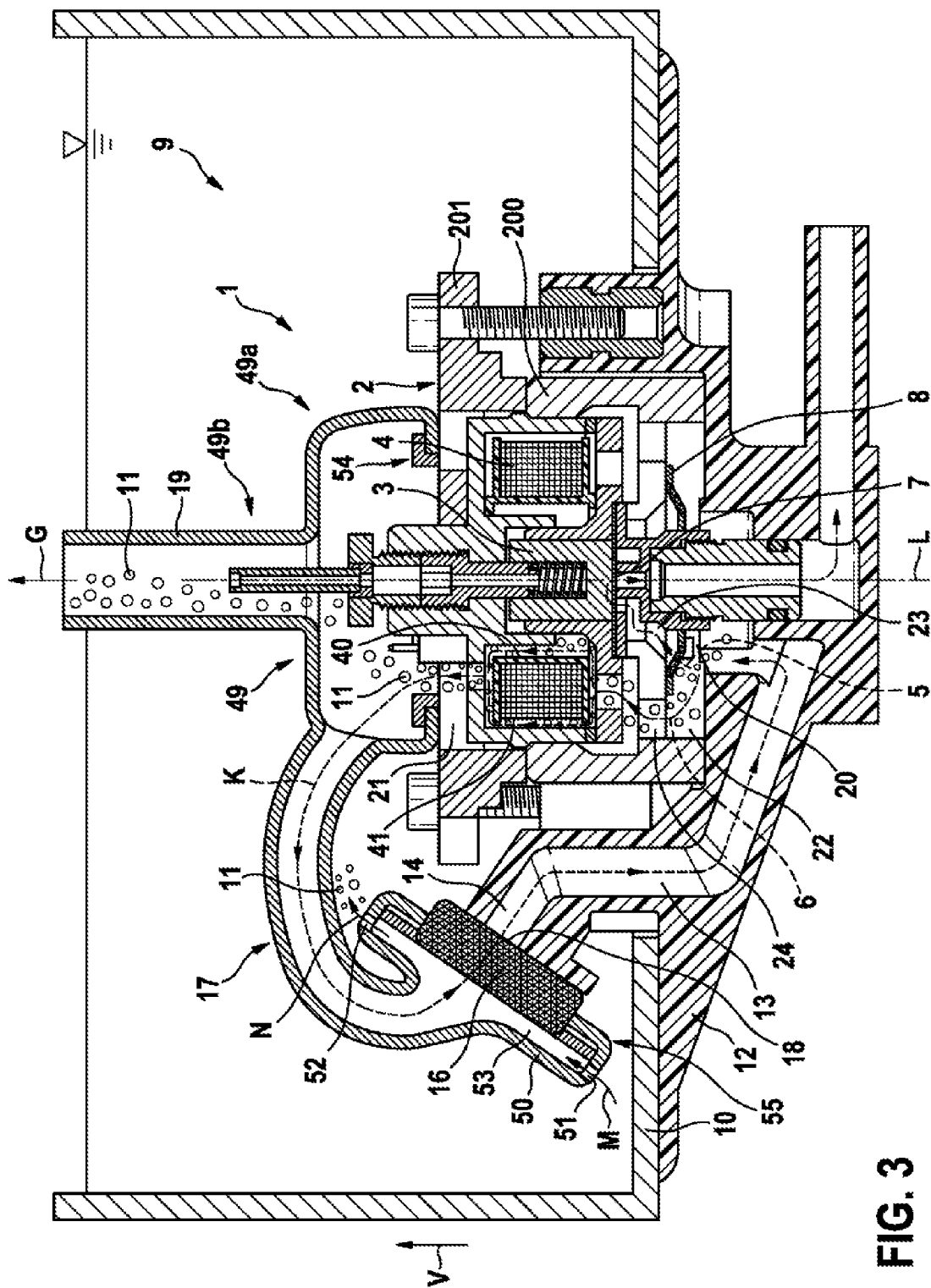

A fuel pump 1 and fuel pump arrangement 9 according to a second exemplary embodiment of the present invention are described in detail below with reference to FIG. 3.

The second exemplary embodiment differs from the first exemplary embodiment in principle in that a recirculation line 17 is provided. Preferably, the recirculation line 17 is made of plastic. Furthermore, the recirculation line 17 connects the first housing opening 21 of the pump housing 2 to the second housing opening 18 of the housing component 12, wherein the second housing opening 18 stands in flow connection with the inlet 20 of the fuel pump 1. Also, the second housing opening 18 is arranged at the first end 14 of the return channel 13.

Furthermore, the recirculation line 17 has a branch line 19 downstream of the first housing opening 21. Vapor bubbles occurring can be removed from the fuel pump 1 through the branch line 19 (arrow G). In particular, the branch line 19 is formed rectilinear in the vertical direction V. In addition, the branch line 19 is arranged centrally relative to the longitudinal axis L of the fuel pump 1.

The recirculation line 17 furthermore has a bell-shaped region 49 which is arranged at the first housing opening 21, in particular centrally relative to the longitudinal axis L of the fuel pump. The bell-shaped region 49 in turn is divided into a lower region 49a of wider cross-section and a pin-shaped protruding lower region 49b. Here, the pin-shaped protruding lower region 49b serves as a branch line 19. Alternatively, a separate line may be attached to the pin-shaped protruding lower region 49b.

Moreover, the recirculation line 17 has a cover region 50 via which the recirculation line 17 is arranged on the second housing opening 18 of the housing component 12. The cover region 50 has a first cover opening 51 and a second cover opening 52 which is arranged above the first cover opening 51 in the vertical direction V. The cover region 50 defines a mixing zone 53, the function of which will be explained in more detail below. Cool fuel from the fuel tank 10 enters the mixing zone 53 through the first cover opening 51 (arrow M), in which zone the cooler fuel is mixed with the fuel heated by the waste heat of the actuator 4. Vapor bubbles which are still present in the recirculating fuel, or vapor bubbles which occur due to the gasification of the fuel drawn out of the fuel tank because of high ambient temperature or direct sunshine, in conjunction with the mixing with the recirculating warmer fuel, are dissipated through the second cover opening 52 into the fuel tank 10 (arrow N). In this way, the recirculating fuel is cooled and the suction region of the fuel pump 1 is also cooled. Thus the delivery behavior of the fuel pump 1 can be significantly improved.

To allow simple and secure fixing of the recirculation line, the recirculation line 17 is arranged on the pump housing 2 by means of a first clip connection 54, and on the filter element 16 by means of a second clip connection 55. The first clip connection 54 and the second clip connection 55 each comprise a plurality of clip tabs which are arranged at both ends of the recirculation line 17, and a plurality of clip lugs in which the clip tabs engage. The clip lugs are in particular formed as circular peripheral protrusions.

What is claimed is:

1. A fuel pump comprising:
    a pump housing (2),
    a delivery element (3) for delivering fuel,
    a heat-generating actuator (4) for actuating the delivery element (3),
    a first fuel path (5) which leads from an inlet (20) to a first delivery space (7), and
    a second fuel path (6) which leads from the inlet (20) past the heat-generating actuator (4) to a first housing opening (21),
    wherein the first housing opening (21) is arranged above the inlet (20) in the vertical direction (V),
    wherein a deflector element (8) is arranged on the pump housing (2) and deflects fuel after the inlet (20) in the direction of the second fuel path (6) and,
    wherein the deflector element (8) has a filter through which the first fuel path (5) runs via a first fuel path opening (23).

2. The fuel pump as claimed in claim 1, wherein a flow direction in the second fuel path (6) substantially corresponds to a longitudinal axis (L) of the fuel pump (1).

3. The fuel pump as claimed in claim 1, wherein the deflector element (8) has a tilt angle (a) from 0 to 90 degrees relative to the longitudinal axis (L) of the fuel pump (1).

4. The fuel pump as claimed in claim 1, wherein the filter of the deflector element (8) is a cone filter, wherein the first fuel path (5) runs through the cone filter via a first fuel path opening (23).

5. The fuel pump as claimed in claim 4, wherein the pump housing (2) has a second fuel path opening (24) through which the second fuel path (6) runs, and wherein the cone filter terminates directly at the second fuel path opening (24).

6. The fuel pump as claimed in claim 1, wherein the second fuel path (6) leads past an inside (40) and an outside (41) of the heat-generating actuator (4).

7. The fuel pump as claimed in claim 1, wherein the heat-generating actuator (4) is a magnetic coil.

8. The fuel pump as claimed in claim 1, furthermore comprising a recirculation line (17) which connects the first housing opening (21) of the pump housing (2) to a second housing opening (18) of a housing component (12), wherein the second housing opening (18) stands in flow connection with the inlet (20) of the fuel pump (1).

9. The fuel pump as claimed in claim 8, wherein the recirculation line (17) has a branch line (19) downstream of the first housing opening (21).

10. The fuel pump as claimed in claim 9, wherein the branch line (19) is formed rectilinear in the vertical direction (V).

11. The fuel pump as claimed in claim 8, wherein a second filter element (16), which is arranged on the housing component (12), is provided between the recirculation line (17) and the second housing opening (18).

12. The fuel pump as claimed in claim 8, wherein the recirculation line (17) has a cover region (50) via which the recirculation line (17) is arranged on the second housing opening (18) of the housing component (12), and which has at least one first cover opening (51) and at least one second cover opening (52), wherein the at least one second cover opening (52) is arranged above the at least one first cover opening (51) in the vertical direction (V).

13. A fuel pump arrangement comprising a fuel pump (1) as claimed in claim 1, and a fuel tank (10) in which the fuel pump (1) is at least partially arranged.

14. The fuel pump arrangement as claimed in claim 13, wherein the second fuel path (6) opens into the fuel tank (10).

15. The fuel pump as claimed in claim 1, wherein the deflector element (8) has a tilt angle (a) from 30 degrees to 60 degrees relative to the longitudinal axis (L) of the fuel pump (1).

16. The fuel pump as claimed in claim 1, wherein the deflector element (8) has a tilt angle (a) of 45 degrees relative to the longitudinal axis (L) of the fuel pump (1).

17. A fuel pump arrangement comprising a fuel pump (1) as claimed in claim 1, and a fuel tank (10) in which the fuel pump (1) is completely arranged.

18. A method for operating a fuel pump, comprising the steps:
    supplying fuel from a fuel tank (10) via a first fuel path (5) into a delivery space (7), wherein the first fuel path (5) leads from an inlet (20) of the fuel pump (1) through a deflector element (8) and to the delivery space (7),
    using the deflector element (8) to filter the fuel supplied into the delivery space (7), and
    conducting fuel from the fuel tank (10) via a second fuel path (6) past a heat-generating actuator (4), wherein the second fuel path (5) leads from the inlet (20) to a first housing opening (21), and wherein the fuel is heated by the heat-generating actuator (4) for gasification of highly volatile parts of the fuel,
    wherein the first housing opening (21) is arranged above the inlet (20) in the vertical direction.

19. The method for operating a fuel pump as claimed in claim 18, wherein after the inlet (20), fuel is deflected in the direction of the second fuel path (6).

20. The method for operating a fuel pump as claimed in claim 18,
- wherein the heated fuel enters the fuel tank (10) via the first housing opening (21) and is cooled in the fuel tank (10), and
- wherein the cooled fuel is returned to the inlet (20) of the fuel pump (1).

21. A fuel pump comprising:
- a pump housing (2),
- a delivery element (3) for delivering fuel,
- a heat-generating actuator (4) for actuating the delivery element (3),
- a first fuel path (5) which leads from an inlet (20) to a first delivery space (7), and actuator (4) to a first housing opening (21),
- wherein the first housing opening (21) is arranged above the inlet (20) in the vertical direction (V),
- wherein a deflector element (8) is arranged on the pump housing (2) and deflects fuel after the inlet (20) in the direction of the second fuel path (6) and,
- wherein the deflector element (8) has a cone filter, wherein the first fuel path (5) runs through the cone filter via a first fuel path opening (23).

* * * * *